Figure 1:
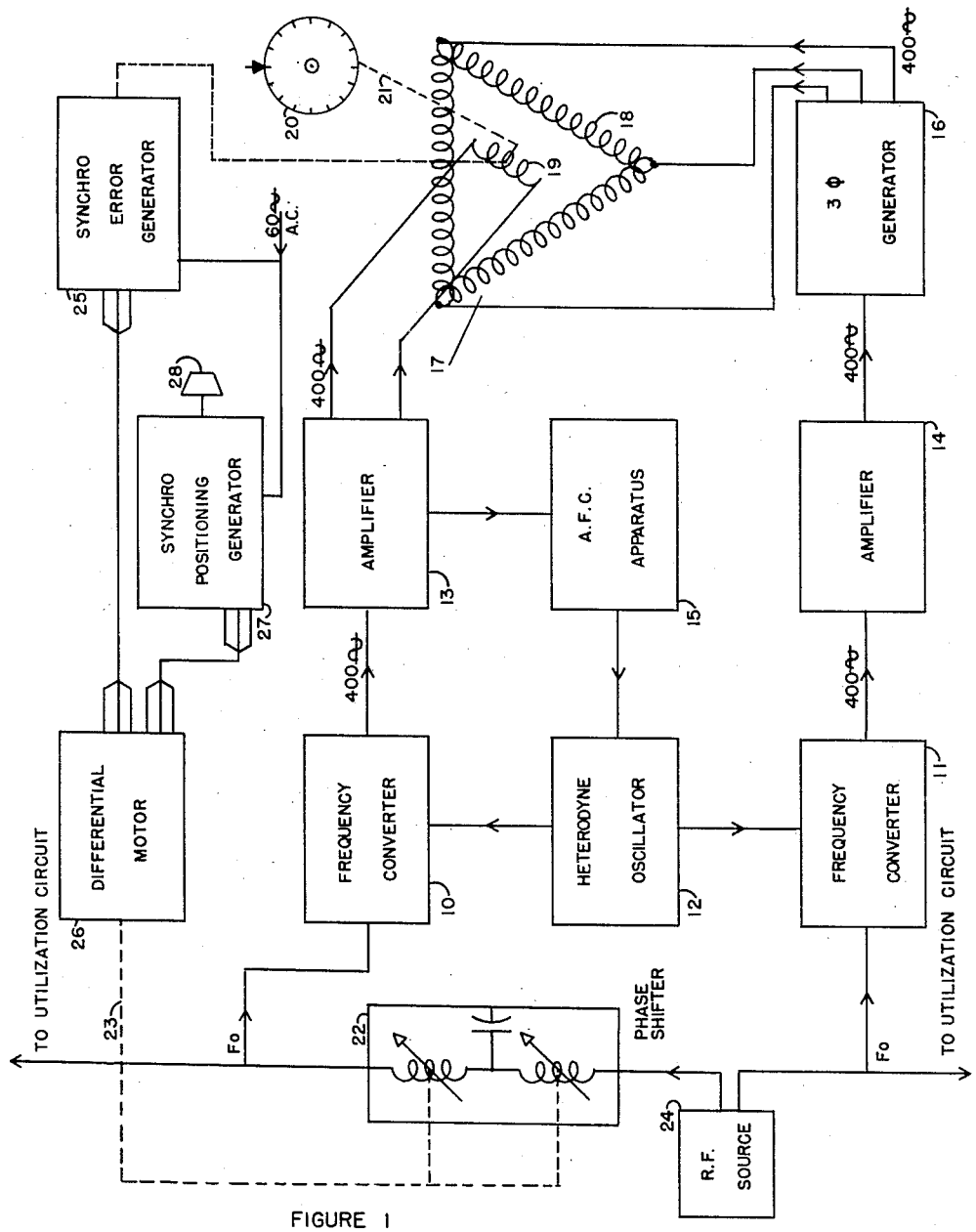

Dec. 5, 1950     C. X. CASTLE     2,532,890
PHASE MONITOR

Filed April 8, 1946     2 Sheets—Sheet 1

CLEMENS X. CASTLE *Inventor*

By Samuel J. Snyder
*Attorney*

Dec. 5, 1950     C. X. CASTLE     2,532,890
PHASE MONITOR

Filed April 8, 1946     2 Sheets-Sheet 2

CLEMENS X. CASTLE Inventor.

By Samuel J. Snyder

Attorney

Patented Dec. 5, 1950

2,532,890

UNITED STATES PATENT OFFICE 2,532,890

PHASE MONITOR

Clemens X. Castle, Silver Spring, Md., assignor to Raymond M. Wilmotte, New York, N. Y.

Application April 8, 1946, Serial No. 660,325

13 Claims. (Cl. 323—105)

1

This invention relates to the measurement and monitoring of phase differences between currents of the same frequency.

In many applications it is important to maintain the phase of one or more currents accurately set to a pre-determined value. In radio broadcasting, for example, the transmitting station may have an antenna system consisting of two or more towers, each energized with currents having a predetermined relative phase. In order to maintain the prescribed radiation pattern of such an antenna system, it is important to very accurately control these relative phases and, consequently, it is also important to have a means which accurately and easily measures these relative phase differences. It is one object of my invention to provide a method and apparatus for readily measuring and monitoring phase differences between alternating currents.

One feature of my invention is its applicability to a wide range of frequencies without recalibration or circuit modifications.

A second feature of my invention is that it simultaneously provides a means for indicating and re-adjusting the phase difference to its required value.

Other objects and features of my invention will be understood from the drawing and the following description and claims.

Figure 1 of the drawing shows a schematic diagram of one embodiment of my invention.

Figure 2:
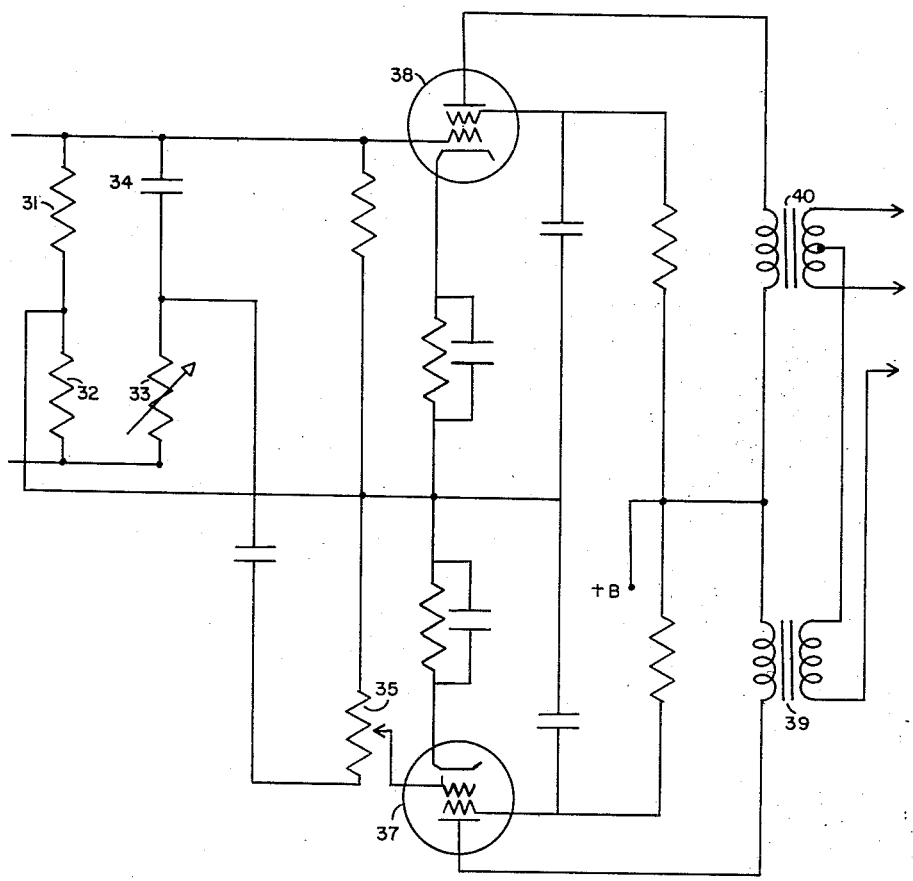

Figure 2 shows the circuit of the three-phase generator used in Figure 1.

Figure 1 shows apparaatus for heterodyning two radio frequency currents to an audio frequency, say of 400 C. P. S., amplifying each of these audio frequency currents, and deriving three phase currents from one of said audio frequency currents. The three phase currents and the other audio frequency current are impressed on a synchro motor. The synchro rotor will then adjust itself to a position corresponding to the phase difference between the single phase and the three phase currents. The rotor turns a dial indicator and may also control a variable phase shifter so as to compensate for deviations from the desired phase difference.

The synchro motor referred to throughout this specification is a well known type of motor and commercially bears the trade names of "Selsyn," "Autosyn," etc. It generally consists of a three phase stator winding and a single phase rotor winding. The rotor is mechanically damped to prevent rotation as a synchronous motor. It is not necessary that the stator be a three phase

2 winding, although this is the most common form in commercial practice. The stator may consist of two windings producing magnetic fields at right angles and energized by currents 90° apart in phase, in order to produce a rotating magnetic field. It is evident that a synchro can have other types of windings, the essential characteristic being that one winding produces a rotating magnetic field and the other winding be capable of rotating so that its field comes into angular alignment with the rotating field. The term "three phase," or more generally "$n$-phase," currents or voltages is a standard term referring to currents or voltages having phase differences of $$\frac{360}{n} \text{ degrees}$$

or an integral multiple thereof, and having equal amplitudes.

Referring to Figure 1 of the drawing, currents of any desired frequency, as, for example, from a radio frequency source 24, may be shifted in phase by a phase shifter 22 and supplied to a utilization circuit. The phase shifted current and a current derived directly from the source 24 have a frequency $F_0$ and are fed to a pair of frequency converters 10 and 11, in which they are heterodyned with a frequency derived from the heterodyne oscillator 12. The frequency of the heterodyne oscillator is adjusted so that the difference of frequency derived from the converters 10 and 11 has a predetermined value. Since one type of commercial synchro motors is adapted to operate at 400 C. P. S., I have chosen this frequency as the output frequency of the frequency converter. The 400 C. P. S. currents are amplified by audio amplifiers 13 and 14, which may consist of as many stages as are necessary. One of the 400 cycle currents is then fed to a three phase generator 16. Such generators are well known in the art and may take the form, for example, of a Scott transformer, a circuit for which is shown in Figure 2. It is important that the output of the three phase generator consist of currents accurately phased 120° from each other and of the same amplitude. In order to maintain the heterodyne oscillator frequency such as to derive a frequency close to 400 C. P. S. from the converter, an automatic frequency control apparatus 15 may be utilized to control the frequency of the heterodyne oscillator. The automatic frequency control apparatus 15 may be the same as that utilized for controlling the heterodyne oscillator in radio receivers, and other radio apparatus, and generally consists of a discriminator accurately tuned to the beat frequency, which is 400 C. P. S. in this case and a reactance tube controlling the tuning of the heterodyne oscillator. If the frequency F₀ is constant, as is the case in radio broadcasting stations, the heterodyne oscillator may be of a fixed frequency type, such as, for example, a quartz crystal oscillator, and in this case the automatic frequency control apparatus is not necessary.

The three phase currents derived from the three phase generator 16 are impressed on the stator winding 18 of the synchro motor 17, while the single phase current obtained from the audio frequency amplifier 13 is impressed on the rotor 19 of the synchro motor. A dial 20 having a mechanical link 21 to the rotor 19 is provided for indicating the angular position of the rotor 19. The rotor 19 has an electro-mechanical link 23 to the phase shifting device 22 in order to readjust phase shifter 22 to its proper value whenever a deviation from this value occurs.

Figure 2 shows a circuit which may be used as the three-phase generator 16 of Figure 1. The single phase output from the audio amplifier 14 is fed across a pair of equal resistors 31 and 32, in parallel with which are a variable resistor 33 and condenser 34. The resistance of the resistor 33 is set equal to the reactance of condenser 34. Voltages are then tapped off network 31, 32, 33 and 34 and impressed on the control grids of tubes 37 and 38 in the manner shown. These voltages will then be equal in amplitude and 90° out of phase. The outputs of tubes 37 and 38 are then impressed across a Scott transformer 39 and 40 in which one secondary is tapped to the midpoint of the other in the manner shown. The grid leak 36 is in the form of a potentiometer so that the voltage impressed on the control grid of tube 37 will produce output currents in the Scott transformer which are 120° out of phase and of equal amplitude.

The electromechanical link 23 includes a synchro error generator 25 mechanically linked to the rotor 19. The three phase output of generator 25 feeds the stator, say, of a differential motor 26, while the rotor of differential motor 26 is fed by three phase currents from synchro positioning generator 27. A control knob 28 positions the rotor of generator 27. The rotors of synchro generators 25 and 27 are energized by 60 C. P. S. alternating current.

When control knob 28 is turned the output of synchro generator 27 is changed. The differential motor 26 will then turn the phase shifter 22. The rotor 19 of synchro motor 17 will then turn and position the rotor of synchro generator 25. When the rotor of generator 25 is thus moved to the same angular position as the rotor of generator 27, the differential motor 26 will stop turning. Thus turning knob 28 will produce a phase shift which will be indicated on dial 20. If a phase deviation occurs the deviation is indicated on dial 20, and at the same time generator 25 sends a signal to differential motor 26 which causes it to adjust phase shifter 22 to correct the deviation.

Snychro generators and differential motors are well known and understood in the art and need no further elaboration. I have shown a single stage of frequency conversion for simplicity, although multiple heterodyning is well known. Instead of the electromechanical link 23, rotor 19 may have a de-clutchable mechanical link to phase shifter 22.

While the foregoing specification describes in detail a preferred form of the invention, it is understood that many changes therein may be made by those skilled in the art without departing from the scope of the invention as defined in the appended claims.

The invention claimed is:

1. Apparatus for monitoring the phase relationship between two alternating currents of the same radio frequency comprising means for converting the alternating currents to two currents of the same audio frequency, means for causing one of said two audio frequency currents to produce a rotating magnetic field, a rotatable electromagnet positioned in the rotating magnetic field, means for energizing the rotatable electromagnet with the other of the two audio frequency currents, whereby the electromagnet is rotated to an angular position corresponding to the phase relationship of the two alternating currents, and means for varying the phase difference between the two alternating currents in response to the rotation of the electromagnet.

2. In a system for measuring the relative phases of two radio frequency signals of identical frequency, a first mixer for converting one of said two radio frequency signals to a fixed audio frequency, a second mixer for converting the other of said two radio frequency signals to said fixed audio frequency, a single source of local oscillator signal coupled to said first and second mixers, means for automatically controlling the frequency of said single source of local oscillator signal to maintain said fixed audio frequency at an invariable predetermined value, a first amplifier connected to amplify the output of said first mixer at said fixed audio frequency, a second substantially identical amplifier connected to amplify the output of said second mixer at said fixed audio frequency, a phase difference responsive means responsive to the outputs of said amplifiers for indicating the phase difference of said frequency audio signals.

3. In a system for measuring the relative phases of first and second radio frequency signals variable in frequency over a range of values, said first and second radio frequency signals having always identical frequencies, a single source of local oscillations, a first mixer responsive to said local oscillations and to said first radio frequency signals for providing a first audio frequency signal having a phase dependent on the phase of said first radio frequency signals, a second mixer responsive to said local oscillations and to said second radio frequency signals for providing a second audio frequency signal having a phase dependent on the phase of said second radio frequency signals, means for automatically controlling the frequency of said local oscillations during variations of frequency of said radio frequency signals to maintain at a constant fixed predetermined value said frequency of said audio frequency signals, a first audio amplifier for amplifying said first audio frequency signal with predetermined phase shift, a second audio amplifier for amplifying said second audio frequency signal with a predetermined phase shift, said phase shifts remaining constant during variation in frequency of said radio frequency signals, and means for indicating the relative phases of the amplified first and second audio frequency signals.

4. The combination in accordance with claim 3 wherein said first and second amplifiers are substantially identical.

5. The combination in accordance with claim 3 wherein said means for indicating comprises a motor and a visual indicator driven thereby, said motor responsive to at least one of said audio frequency signals.

6. In a system for measuring the relative phases of first and second high frequency signals, variable in frequency over a range of values, said first and second high frequency signals having always identical frequencies, a single source of local oscillations, a first mixer responsive to said local oscillations and to said first high frequency signals for providing a first low frequency signal having a phase dependent on the phase of said first high frequency signal, a second mixer responsive to said local oscillations and to said second high frequency signals for providing a second low frequency signal having a phase dependent on the phase of said second high frequency signal, means for maintaining at a fixed invariable predetermined value the frequency of said first and second low frequency signals despite variation of frequency of said first and second high frequency signals, and means for measuring the relative phase of said first and second low frequency signals.

7. The combination in accordance with claim 6 wherein said means for measuring comprises a mechanical indicator and motor means responsive to said low frequency signals for actuating said mechanical indicator to indicate said relative phases of said first and second low frequency signals.

8. The combination in accordance with claim 6 wherein is provided means for automatically establishing and maintaining a predetermined phase difference between said low frequency signals.

9. The combination in accordance with claim 2 wherein is further provided means responsive to the output of said amplifiers for establishing and maintaining a predetermined phase difference between said outputs.

10. The combination in accordance with claim 3 wherein is further provided means responsive to said first and second audio frequency signals for automatically establishing and maintaining said first and second audio frequency signals at a predetermined difference of phase angle.

11. In a system for measuring the relative phase of first and second radio frequency signals for a range of frequencies of said signals, the combination comprising, means for converting said first and second radio frequency signals to first and second audio signals, means for controlling said means for converting to maintain said first and second audio signals at a fixed predetermined frequency for all frequency values of said first and second radio frequency signals in said range, and means for measuring the phase difference between said first and second audio signals as a measure of the phase difference between said first and second radio frequency signals over said range of frequencies.

12. The combination in accordance with claim 11 wherein is provided means responsive to said first and second audio signals for automatically establishing and maintaining a predetermined phase difference between said first and second audio signals.

13. The combination in accordance with claim 11 wherein is provided means responsive to said first and second audio signals for automatically establishing and maintaining a predetermined phase difference between said first and second radio frequency signals.

CLEMENS X. CASTLE.

REFERENCES CITED

The following references are of record in the file of this patent:

UNITED STATES PATENTS

| Number | Name | Date |
|---|---|---|
| 2,206,637 | Koch | July 2, 1940 |
| 2,240,680 | Stuart | May 6, 1941 |
| 2,253,392 | Oman | Aug. 19, 1941 |
| 2,256,482 | Ibister et al. | Sept. 23, 1941 |
| 2,402,904 | Millar | June 25, 1946 |
| 2,422,386 | Anderson | June 17, 1947 |